United States Patent [19]
Getzlaff et al.

[11] Patent Number: 5,870,601
[45] Date of Patent: *Feb. 9, 1999

[54] DATA PROCESSING APPARATUS AND METHOD FOR CORRECTING FAULTY MICROCODE IN A ROM DEVICE VIA A FLAG MICROINSTRUCTION IN A RAM DEVICE INCLUDING CORRECTED MICROCODE

[75] Inventors: Klaus Jorg Getzlaff, Schönaich; Thomas Pflueger, Leinfelden-Echterdingen; Ralph Koester, Holzgerlingen; Christian Mertin, Böblingen; Hans-Werner Tast, Weil i.Schönbuch, all of Germany

[73] Assignee: International Business Machines Corporation, Armonk, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 750,756
[22] PCT Filed: Aug. 29, 1995
[86] PCT No.: PCT/EP95/03394
  § 371 Date: Dec. 16, 1996
  § 102(e) Date: Dec. 16, 1996
[87] PCT Pub. No.: WO97/08618
  PCT Pub. Date: Mar. 6, 1997
[51] Int. Cl.$^6$ ............................................... G06F 11/00
[52] U.S. Cl. ............... 395/591; 395/182.03; 395/183.01; 395/183.06; 395/185.07; 395/598; 395/567; 395/568; 371/10.1; 371/10.2

[58] Field of Search ........................... 395/591, 595–596, 395/598, 182.03, 182.06, 182.08, 183.01, 185.07, 183.18; 371/10, 11, 12, 10.1, 10.2

[56] References Cited

U.S. PATENT DOCUMENTS

| | | | |
|---|---|---|---|
| 5,212,693 | 5/1993 | Chao et al. | 395/182.03 |
| 5,483,638 | 1/1996 | Katsuta | 395/183.06 |
| 5,561,760 | 10/1996 | Ferris et al. | 395/183.01 |
| 5,701,506 | 12/1997 | Hosotani | 395/182.03 |

*Primary Examiner*—Parshotam S. Lall
*Assistant Examiner*—Bharat Barot
*Attorney, Agent, or Firm*—Marc A. Ehrlich

[57] ABSTRACT

The present invention relates to a data processing apparatus which comprises a microprogrammable processor 1, a random access control store 4 and a read only control store 5 for storage of microinstructions. The random access control store includes a flag microinstruction (REPmark1) for indicating that another microinstruction (add W, 2, W1), stored in the read only control store 5, is faulty. The control stores are coupled to a multiplexer 8 and are adapted to output the microinstructions in parallel to the multiplexer 8 which is in turn coupled to the processor and which selectively provides output from either the random access control store or the read only control store to the processor 1. The apparatus also includes a decoder coupled to the random access control store for observing the microinstructions output therefrom. The decoder is further coupled to inhibiting logic in the processor and outputs a signal if the flag microinstruction is output from the random access control store. The signal causes the inhibiting logic in the processor to inhibit the processor from carrying out the faulty microinstruction.

8 Claims, 3 Drawing Sheets

DATA PROCESSING APPARATUS AND METHOD FOR CORRECTING FAULTY MICROCODE IN A ROM DEVICE VIA A FLAG MICROINSTRUCTION IN A RAM DEVICE INCLUDING CORRECTED MICROCODE

The invention relates to a data processing apparatus, a method for storage of microcode and a method for correcting faulty microcode.

The programming language utilized to program microprocessors or processors in general is commonly referred to as assembler language or assembly language. Each individual assembler instruction is referred to as a microinstruction, and each macroinstruction usually consists of a plurality of microinstructions. Microinstructions are the basic or primitive instructions that the microprocessor or processor can perform. The macroinstructions are a higher level language than the microinstructions and typically require several states to complete execution. Depending on the particular microprocessor or processor, the microinstructions required to implement a specific macroinstruction will vary.

A microprocessor or processor system consists basically of three main modules; namely, the microcontrol logic module, the control memory logic module, and the data path module. The two major functional areas of concern are the microcontrol logic module and the control memory logic module. The data path module is responsible for the manipulation of data through the system. The microinstructions are stored in the control memory and are collectively referred to as the system or processor firmware. Each microinstruction consists of a plurality of fields including one field which is used in conjunction with the processor control flags and the operation code of the macroinstruction to determine the next sequential microinstruction to be executed. The other primary field is used to control the data path. The macroinstruction operation code is read by the microcontrol logic and determines which microroutine to execute next.

In high speed processors, the control memory is usually constructed of bipolar read only memories (ROMS) and programmable read only memories (PROMS) and by replacing the particular ROM, the entire macroinstruction set can be changed. In conventional processors, ROM is widely used for implementing an on-chip control store (control memory). As compared with an off-chip control store, this approach eliminates chip-crossing in the critical path and offers a very large data width, both of which are crucial for the high speed performance of the system. ROM is chosen because it has a density which is approximately 10 times better than that of static random access memory (RAM). However, ROM can only be programmed with mask levels during fabrication which becomes a major disadvantage during the system development stage. A simple microcode error can block the whole system development effort for a significant amount of time. It is therefore desirable to detect and correct instructions without having to reprogram to ROM.

U.S. Pat. No. 4,644,539 to Sato discusses a variety of earlier conventional circuit arrangements for processing a fault or an error occurring in a control memory. One such circuit arrangement for the detection and correction of errors associated with incorrect instructions comprises an error detecting circuit and an error correcting circuit together with a control memory loaded with a plurality of microinstructions. The error detecting circuit is for detecting an error of each microinstruction read out of the control memory while the error correcting circuit is for correcting the error to obtain a correct microinstruction. With this structure, each microinstruction is always sent from the control memory through both the error detecting circuit and the error correcting circuit even when an error is not detected by the error detecting circuit. Therefore, an increase of a machine cycle is inevitable.

In another conventional circuit arrangement, the error detection is normally carried out for each microinstruction read out of a control memory by the use of an error detection circuit. An error correction circuit is operated only when an error is detected by the error detection circuit. With this structure, it is possible to shorten the machine cycles as compared with the above-mentioned circuit arrangement. However, the error correction circuit corrects an error of each microinstruction each time an erroneous portion of control memory is accessed. Therefore, it takes a long time to process each microinstruction read out of the erroneous portion. This lengthens the average time of executing the microinstructions when a hardware error occurs in the control memory.

Both of the above described prior art circuit arrangements carry out not only error detection but also error correction when an error is detected. In order to enable the error correction, each microinstruction should be formed by an error correcting code. In contrast, error detection may be simply performed via the addition of one or more parity bits, as in, for example, error correcting code which requires a number of redundant bits greater than the number of parity bits. This form of error correcting code is well known in the art. Thus, use of the error correcting code results in the control memory of an increased bit capacity. In addition, neither of the above described prior art circuit arrangements can correct microcode errors resulting from programming mistakes One embodiment for correcting errors in microcode is disclosed by Chang et al. in IBM TDB, 31,11 (April 1989), which uses a programmable instruction detection circuit. When there is an error associated with the implementation of an instruction, the detection circuit can be programmed to recognize the op code, and the instruction can be treated as an un-implemented instruction. Software emulation can be written to execute the instruction and bypass the problem. However, this system cannot verify the correctness of the revised microcode.

Japanese Patent No. 58-16349 discloses a memory extension substituting system to facilitate the substitution of faulty instructions with error free instructions. In this patent, the implementation of the system is based on the detection of a particular address of the microinstruction rather than on the detection of a particular operational code of the instruction. When a particular address is detected, a substitute address pointing to an area of memory which has error free microinstructions is provided. A no-op cycle for timing purposes has to be inserted when the microinstruction is invalidated by the system. This no-op state can happen in the middle of the execution of an instruction, which can make the design and debugging of the system more difficult.

Japanese Patent No. 58-16350 also discloses a memory extension substituting system. In this patent, when the specific address of a microinstruction with a fault is detected by a coincidence means, a substitute instruction is provided. Basically, to correct n microinstructions, the detection circuit detects and generates replacement addresses for n microaddresses. However, it is only feasible to implement a system capable of handling n microinstructions, where n is limited to small numbers due to the limitation on the size and performance of the detection circuits.

Japanese Patent No. 59-85545 discloses a correcting and processing system for the contents of a system ROM. In this patent, the system disclosed provides for a technique which involves the bypassing of errors in the system ROM containing the system program, and not errors in the control store ROM which contains the microcode.

From EP-A-0 469 239 an apparatus for correcting faulty microcode contained in a control store of a microprogrammed processor is known. The apparatus comprises two functional parts; namely, the detection circuit for detecting operational codes that correspond to faulty microinstructions in the main control store ROM of the system and a programmable array which is used as the storage area for substitute microinstructions. The detection circuit is a circuit which operates as a logic NOR circuit and is utilized to detect valid operational codes of microinstructions that correspond to microcode sequences that contain errors or faults. The programmable array consists of two loadable RAM's which contain error free microcode to replace the faulty microcode. The detection and correction occurs in parallel with the instruction decoding so that it does not have any impact on system cycle time.

EP-A-0 397 414 discloses a control device which includes a memory storing a plurality of micro instructions. A modifying information generator generates modifying information. A modifying unit receives one of the micro instructions and the modifying information from the memory and the modifying information generator respectively. The modifying unit modifies at least part of the one of the micro instructions with the modifying information.

EP-B-0 178 670 discloses a control store memory read error resiliency method and apparatus. Instruction read error detection and recovery is accomplished by permitting the unchecked instruction to be executed in parallel with instruction read error detection by providing for the aborting of the instruction execution upon detection of an error prior to making any change in the state of the system which would prevent the retrying of the instruction after it is read again from memory. Because the reading of the next instruction is initiated during the execution of the current instruction whose validity is checked in parallel with its execution, the present invention provides for the discarding of the next instruction prior to retrying the current instruction by rereading the current instruction followed by re-execution of the current instruction. While the current instruction is being re-executed, the rereading of the next instruction is initiated so that it will be available for execution following the re-execution of the current instruction.

From EP-A-0 419 174 a data processing apparatus based on microprogram control is known. The data processing apparatus includes a microinstruction memory which stores microinstructions, and a microinstruction execution unit which executes a selected one of the microinstructions by a pipeline process and which outputs an operation result. The microinstructions include a specific microinstruction. The data processing apparatus also includes a correction part which has the microinstruction execution unit execute the specific microinstruction when a predetermined event occurs so that the parameter is changed to a corrected parameter which corresponds to a parameter used in an immediately previous pipeline process. The microinstruction execution unit stops operating when the predetermined event occurs and starts the operation again by using the corrected parameter.

It is an object of the present invention to provide an improved data processing apparatus and improved methods for storage of microcode and for correcting of faulty microcode.

The underlying problem of the invention is solved by the features set forth in the independent claims.

The invention enables the more efficient use of ROMs for the storage of microinstructions. This is advantageous because the density of a ROM is much higher than that of a RAM. This advantage is particularly important when the ROM which serves to store microcode is integrated on the same chip as the microprocessor.

If the microcode which is stored in the ROM is faulty, it is not necessary to fabricate another ROM for the corrected microcode or to store the entire microcode sequence which is affected by the faulty microinstruction in the RAM. This would have a negative impact on the processing speed.

In this case the invention proposes to circumvent the faulty microinstruction stored in the ROM by switching to the RAM address space. In the RAM a repair code is stored which serves to substitute for the faulty microinstruction of the ROM. After the execution of the repair code control of the system jumps back to the ROM address space.

It is particularly advantageous that the usage of the RAM is not restricted to the storage of repair code. The RAM can also be used for normal microinstructions, especially microinstructions which are less frequently used than the microinstructions stored in the ROM. This is because the invention can be realized by the addition of only one instruction to the microcode instruction set. The additional microinstruction is to flag the occurrence of a faulty microinstruction. If the system is operating in the RAM mode, i.e. microinstructions are outputted from the RAM to the processor in a normal operational mode where no faulty microinstruction occurred, the flag microinstruction is simply ignored and interpreted as a NOP (no operation).

Furthermore the invention is advantageous since the additional hardware expense to realize the correction of faulty microcode is minimized. Only one additional register and a decoder is necessary to realize the invention as compared to prior art computer systems, such as IBM S/390 computer systems (S/390 is a registered trademark of International Business Machines Corporation).

The invention results in a significant cost reduction in case of faulty microcode in the ROM. Because the correction is accomplished purely by microcode the fabrication of a ROM storing the corrected microcode is obsolete. Also, if the faulty microcode is first detected by a malfunctioning of the computer system at the customer site, no cost intensive field returns are necessary: In this case the problem can be fixed by simply loading a new set of microinstructions in the RAM having the additional flag microinstruction and the repair code.

The invention can also be employed for purposes other than the correction of faulty microcode: If the architecture of a computer system is enhanced this means that the microcode has to be changed. This change of the microcode can also be realized by the teaching of the invention. In this case the microinstruction to be changed is considered to be "faulty" and is replaced by the "repair code" loaded into the RAM. The "repair code" represents the changed microcode due to the change of the architecture.

In the following a preferred embodiment of the invention is explained in greater detail with reference to the drawings in which FIG. 1 is a schematic diagram of the data processing apparatus;

Figure 1:
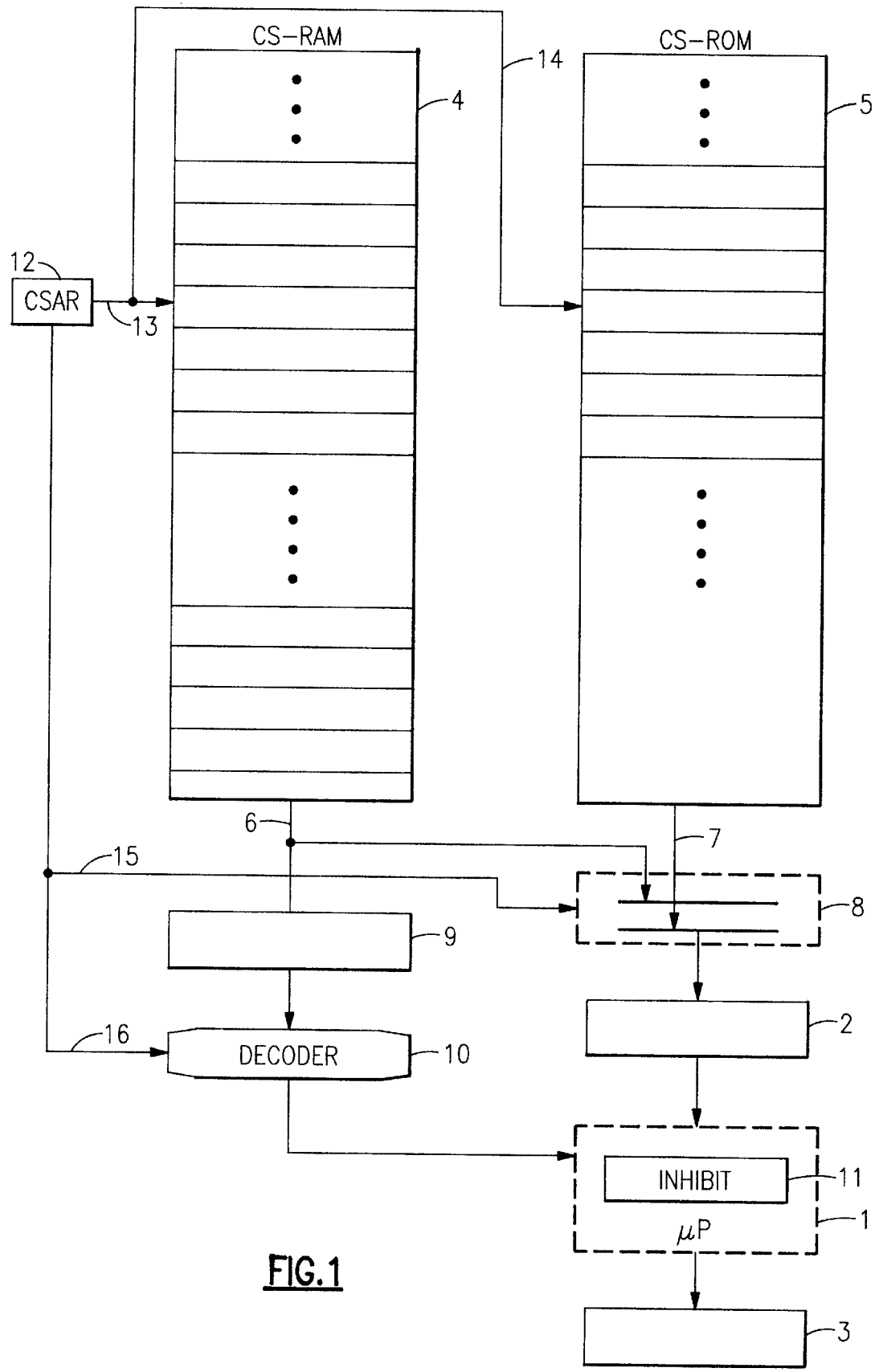

The data processing apparatus shown in FIG. 1 has a microprogrammable processor 1. The processor 1 has an input register 2 and an output register 3. The data processing apparatus further comprises a random access control store CS-RAM 4 and a read only control store CS-ROM 5. The control stores serve to store the microcode for the microprogrammable processor 1.

In this preferred embodiment the CS-RAM 4 and the CS-ROM 5 are integrated on the same chip together with the processor 1. This is to place the control stores as close as possible to the processor 1 in order to minimize access times to the microcode. If the storage space of the CS-RAM 4 and the CS-ROM 5 is not sufficient for all the microcode, it is possible to store some of the micorcode on the main memory of the data processing apparatus. It is known from the prior art that it is advantageous to store those portions of the microcode on the main memory which are not frequently used. This is because every access to the main memory results in a performance penalty of the data processing apparatus on the order of 50 machine cycles. The main memory is not shown in FIG. 1.

The CS-RAM 4 and the CS-ROM 5 have their respective outputs 6 and 7 connected to the multiplexer 8. The multiplexer 8 has its output connected to the input register 2 of the processor 1. The multiplexer 8 selectively couples the CS-RAM 4 or the CS-ROM 5 to the processor 1.

The output 6 of the CS-RAM 4 is also connected to a register 9 of the decoder 10. The output of the decoder 10 is connected to the processor 1. The processor 1 comprises inhibit logic circuitry 11. If a signal is inputted to the inhibit circuitry 11 the inhibit circuitry 11 forces the processor 1 not to carry out the next microinstruction in the pipeline of the processor 1 or at least not to output the result of the next microinstruction in the pipeline. The input signal for the inhibit logic circuitry 11 is provided by the decoder 10.

The data processing apparatus further comprises a control store address register CSAR 12. If a macroinstruction which is not hardwired is to be carried out by the processor 1 this requires that the macroinstruction is translated in a sequence of microinstructions. Such sequences are stored in the CS-RAM 4 and the CS-ROM 5. The first step for carrying out a macroinstruction is to identify the address of the sequence of the microinstructions which belongs to this particular macroinstruction. As it is common practice this is accomplished by means of a look up table which stores the entry addresses of all the microcode sequences. The entry address of the microcode sequence belonging to the particular macroinstruction to be carried out is stored in the CSAR 12. In the preferred embodiment considered here the CSAR 12 is 16 bits wide. The first two bits specify in which of the control stores—CS-RAM 4, CS-ROM 5 or main memory— the microcode sequence to be carried out is stored (Bit 0 and 1). The bit positions 2 to 15 of CSAR 12 define an address space which is common to the CS-RAM 4 and the CS-ROM 5 as well as to the main memory.

If the entry address of the microcode sequence is stored in the CSAR 12 this means that the CSAR 12 points to equivalent address locations in the CS-RAM 4, the CS-ROM 5 and the main memory. Hence, only because of the bit positions 0 and 1 the address stored in CSAR 12 is unambigous.

The pointers 13 and 14 point to equivalent addresses in the CS-RAM 4 and in the CS-ROM 5, respectively. The pointers 13 and 14 are defined by the bit positions 2 to 15 of the CSAR 12. The CSAR 12 is connected to the multiplexer 8 via control line 15 and to the decoder 10 via control line 16.

If the first two bits of the CSAR 12 are 01 this means that the data processing apparatus is in an operational state where a sequence of microinstructions is outputted from the CS-RAM 4. In this case the output 6 of the CS-RAM 4 is coupled to the processor 1 via the multiplexer 8. In this case the decoder 10 which serves to observe the flow of microinstructions outputted from the CS-RAM 4 is not active. To control the activation and deactivation of the decoder 10, the decoder 10 is logically coupled to the CSAR 12 via the control line 16. If the two first bits of the CSAR 12 are 00 the control line 16 carries a signal which deactivates the decoder 10. In this case the decoder 10 cannot cause the inhibition of the carrying out of a microinstruction in the processor 1.

If the first two bits of the CSAR 12 are 00 this indicates that the sequence of microinstructions belonging to the macroinstruction which is to be carried out is stored in the CS-ROM 5. In this case the control line 15 carries a control signal for control of the multiplexer 8 so that the output 7 of the CS-ROM 5 is coupled to the processor 1. When the CS-ROM 5 is coupled to the processor 1 the decoder 10 is activated by the control signal which is carried on line 16. Again, this is caused by the first two bit positions 01 which are stored in the CSAR 12.

Figure 2:
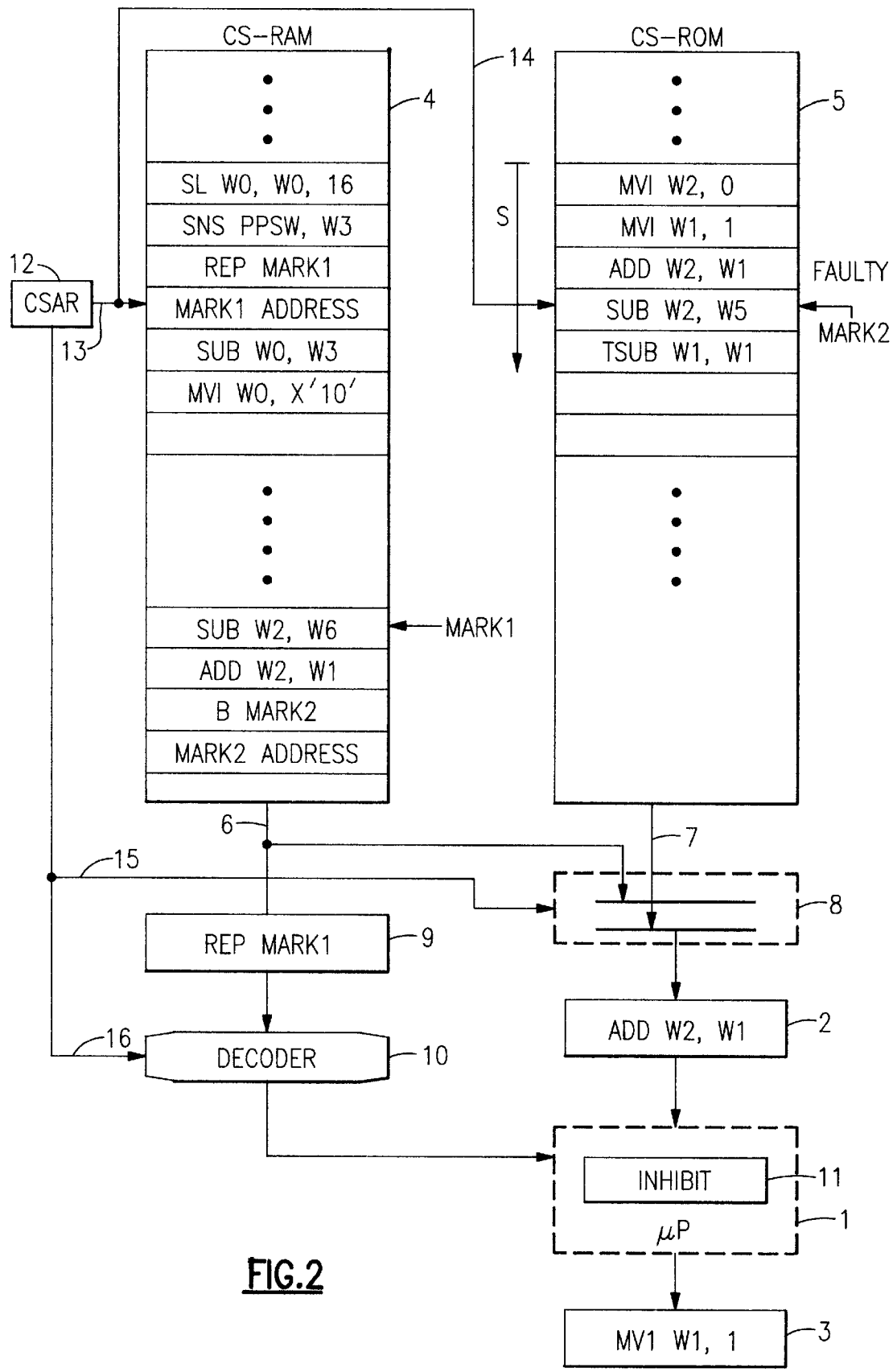
FIG. 2 shows the data processing apparatus in a first operational state.

FIG. 2 shows the data processing apparatus of FIG. 1 in a first state of operation. The initial state of the data processing apparatus is the occurrence of a macroinstruction X in the instruction screen. The macroinstruction X consists of a sequence S of microinstructions which is stored in the CS-ROM 5. This sequence of microinstructions is MVI W2,0; MVI W1,1; ADD W2,W1; SUB W2,W5; TSUB W1,W1. For carrying out the macroinstruction X the entry address of the sequence of the microinstructions in the CS-ROM 5 is identified in the look up table of the data processing apparatus.

In the case considered here the entry address of the sequence S is the address of the first microinstruction MVI W2,0 in the sequence S. The first two bit positions of the full address of this entry address are 0,1 because the sequence S is stored in the CS-ROM 5. The bit positions 2 to 15 of the address of the microinstruction MVI W2,0 indicate the storage address of this instruction in the CS-ROM 5. For carrying out the macroinstruction X the full address of the first microinstruction in the sequence S is stored in the CSAR 12.

Subsequently the first microinstruction MVI W2,0 of the sequence S is outputted at the output 7 of the CS-ROM 5 via the multiplexer 8 to the processor 1. With the following clock cycles the subsequent microinstructions MVI W1,1; ADD W2,W1; SUB W2,W5; TSUB W1,W1 of the sequence S are also outputted.

In the example considered here it is assumed that the microinstruction ADD W2,W1 is invalid. As a consequence the carrying out of the faulty microinstruction ADD W2,W1 is to be prevented in order to correctly carry out the macroinstruction X.

In order to accomplish this a special microinstruction REP is stored on the CS-RAM 4. This microinstruction which is added to the normal set of microinstructions of the data processing apparatus serves to flag that there is a faulty microinstruction in the CS-ROM 5. The flag microinstruction REP has the same address in the CS-RAM 4 as the faulty microinstruction ADD W2,W1 in the CS-ROM 5.

After the entry address has been stored in the CSAR 12 the address in the CSAR 12 is incremented with each output of a microinstruction. The next microinstruction which is outputted is the microinstruction having the incremented address. Since the CSAR 12 points to the CS-RAM 4 and the CS-ROM 5 microinstructions are outputted in parallel at the outputs 6 and 7. In the case considered here only the CS-ROM 5 is coupled to the processor 1 via the multiplexer 8. Hence the microinstructions which are outputted at the output 6 of the CS-RAM 4 are not carried out. When the address stored in the CSAR 12 is incremented by two relative to the entry address, the faulty microinstruction ADD W2,W1 is outputted at the output 7 of the CS-ROM 5. In parallel the flag microinstruction REPmark1 is outputted at the output 6 of the CS-RAM 4.

The flag microinstruction REPmark1 is stored in the register 9 whereas the faulty microinstruction ADD W2,W1 is stored in the input register 2. In the next clock cycle the decoder 10 decodes the flag microinstruction REPmark1. The decoding of this flag microinstruction reveals as a result that the microinstruction REPmark1 is not a normal microinstruction but a special microinstruction which flags that there is a faulty microinstruction—in this case ADD W2,W1—which has been outputted in parallel with the flag microinstruction from the CS-ROM 5. Only upon this occurrence the decoder signals the detection of the flag microinstruction. Other microinstructions which are received by the decoder 10 from the CS-RAM 4 do not cause any response by the decoder 10.

The occurrence of the faulty microinstruction ADD W2,W1 is signaled from the decoder 10 to the processor 1. In response thereto the inhibit logic circuitry 11 inhibits the carrying out of the faulty microinstruction ADD W2,W1 by the processor 1. If the result of the faulty microinstruction ADD W2,W1 has already been calculated the inhibit logics circuitry 11 only inhibits the storage of the result in the output register 3.

After the subsequent incrementation of the address stored in the CSAR 12 the pointer 13 points to mark1 address and the pointer 14 points to sub W2,W5, respectively. This is the state of operation shown in FIG. 2. The command mark1 address specifies a repair address belonging to the flag microinstruction REPmark1. The address contained in mark1 address specifies the address of repair microcode for the faulty microinstruction ADD W2,W1.

Figure 3:
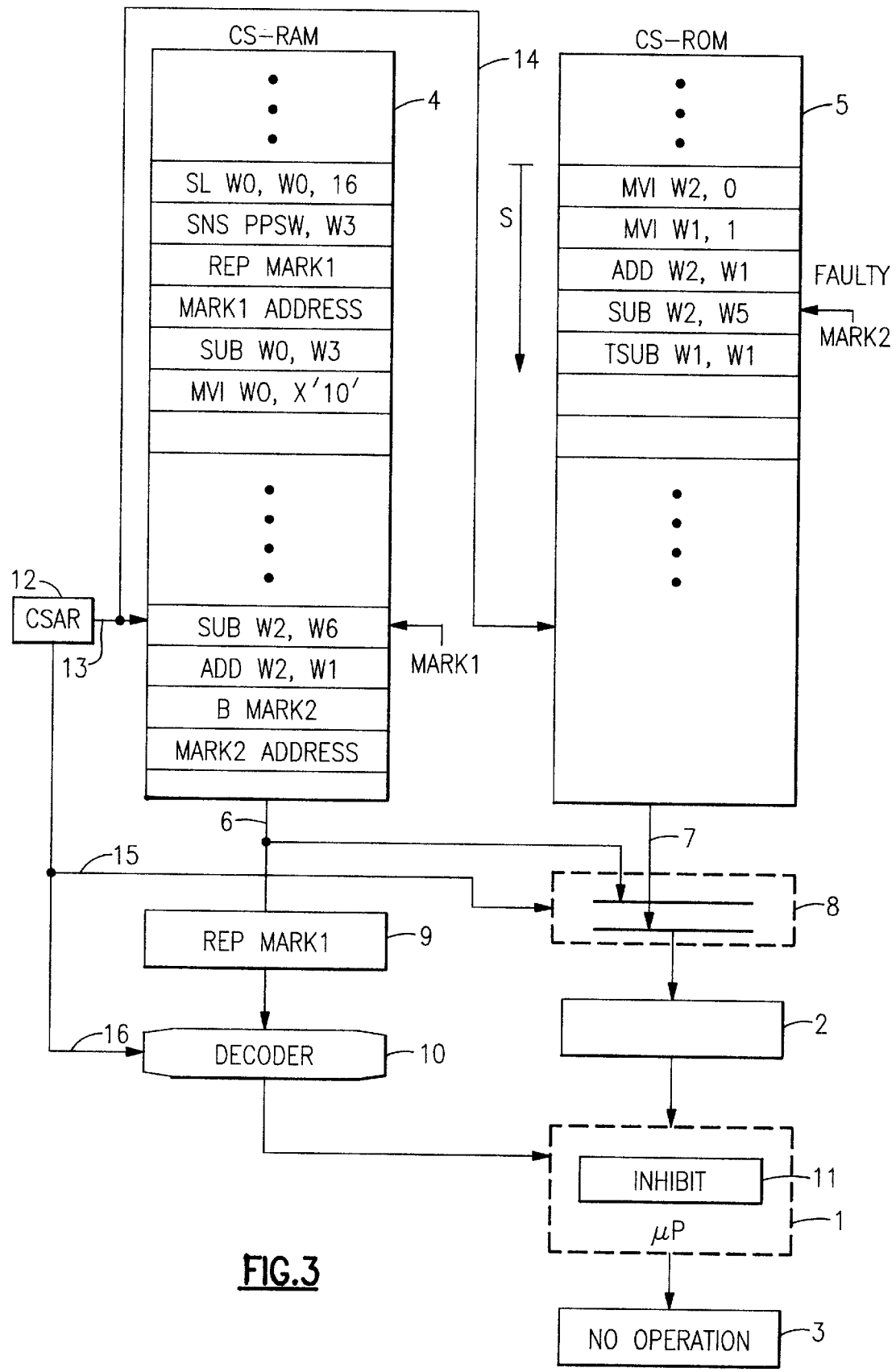
FIG. 3 shows the data processing apparatus of FIG. 1 in a second operational state.

In the next clock cycle the repair address is stored in the CSAR 12 so that the pointer 13 points now to the first instruction of the repair code which substitutes the faulty microinstruction ADD W2,W1. In this case the repair code consists of the two microinstructions SUB W2,W6 and ADD W2,W1. Since the storage of the repair address in the CSAR 12 has also caused the first two bitpositions stored in the CSAR 12 to change from 00 to 01 the CS-RAM 4 is coupled to the processor 1 via the multiplexer 8. With the storage of the repair address in the CSAR 12 the pointer 13 points to the first instruction of the repair code SUB W2,W6 and pointer 14 points to an equivalent position in the CS-ROM 5. This is the situation shown in FIG. 3.

In the subsequent system cycles the repair code is outputted to the processor 1 and carried out by the processor 1. During the carrying out of the repair code the decoder 10 is inactive because of the change of the first two bitpositions in the CSAR 12. At the end of the repair code the microinstructions B mark2 and mark2 address are outputted from the CS-RAM 4. This signals to the control of the data processing apparatus the end of the repair code. Furthermore this also signals the address which is subsequent to the faulty microcode instruction ADD W2,W1 in the sequence S of microinstructions. In this case the subsequent microinstruction is sub W2,W5. Since this microinstruction forms part of the sequence S again the operational state of the data processing apparatus has to be changed: The address of the microinstruction SUB W2,W5 which belongs to Bmark2 is stored in the CSAR 12. This implies that the leading first two bitpositions of the address stored in the CSAR 12 are also changed from 0,1 to 0,0. As a consequence the data processing apparatus returns to the operational mode which existed before the occurrence of the faulty microinstruction.

In the preferred embodiment considered here the CS-RAM 4 and the CS-ROM 5 have an equivalent address space and the same storage capacity. However, it is also possible to employ a CS-ROM which has a bigger address space than the CS-RAM 4. Such a CS-ROM is logically partitioned in a plurality of address spaces corresponding to the address space of the CS-RAM 4. In this case the leading bits of the address stored in the CSAR 12 also has to specify in which of the logical partitions of such a CS-ROM a microinstruction is stored. If the CS-ROM is partitioned into 4 equivalent address spaces this requires the usage of the first 3 bits of the CSAR 12 to signify whether a particular microinstruction is stored in the main store, in the CS-RAM 4 or in a particular partition of the CS-ROM.

We claim:

1. A data processing apparatus for identifying and correcting faulty microcode, said apparatus comprising:

a microprogrammable processor (1);

a random access control store (4) and a read only control store (5), each of said random access control store and said read only control store storing microinstructions, said random access control store and said read only control store being adapted to output said stored microinstructions in parallel, and wherein said stored microinstructions in said random access control store include a flag microinstruction (REP mark 1), said flag microinstruction being written into said random access control store based upon the identification of said faulty microinstruction in said read only control stored and indicating that a faulty microinstruction (ADD W2,W1) is stored in said read only control store, said faulty microinstruction being logically assigned to said flag microinstruction;

a multiplexer (8) coupled to said microprogrammable processor, said multiplexer further coupled to said random access control store and to said read only control store for selectively providing the outputs of said random access control store or said read only control store to said microprogrammable processor;

register means (9) for receiving the microinstructions output from said random access control store, said register means being coupled to said random access control store, said register means receiving said microinstructions output from said random access control store;

a decoder (10) coupled to said register means for receiving said microinstructions output from said random access control store, said decoder for decoding said microinstruction from said register means if the output of said read only control store is provided to said microprogrammable processor via said multiplexer, and wherein said decoder generates a control signal to signal the decoding of said flag microinstruction output from said random access control store if said flag microinstruction is provided from said register means to said decoder;

means (11) for inhibiting the carrying out of said faulty microinstruction, said means for inhibiting coupled to said decoder for receiving said control signal from said decoder, and coupled to said microprogrammable processor for inhibiting the carrying out of said faulty microinstruction by said microprogrammable processor in response to said control signal received from the decoders and a control store address register (CSAR 12) for storage of an address of a microcode sequence which belongs to a microinstruction, said address specifying if said microcode sequence is stored in said read only control store or in said random access control store; and wherein said microinstructions stored in said random access control store further comprise a repair address (mark 1 addr.) belonging to said flag microinstruction for specifying an address of repair microcode for said faulty microinstruction said repair address being stored in said control store address register in response to the signalling of the decoding of the flag microinstruction by said decoder.

2. The data processing apparatus according to claim 1 wherein said random access control store and said read only control store have the same address space.

3. The data processing apparatus according to claim 1 wherein said read only control store includes logically partitioned address spaces corresponding to the address space of the random access control store, each of said address spaces having the same size.

4. The data processing apparatus according to claim 1 said repair address specifying the offset to said address of repair microcode.

5. The data processing apparatus according to claim 1 wherein said read only and said random access control stores are integrated together with said processor on the same chip.

6. A method for identifying and correcting faulty microcode, said method comprising the steps of:

a) storing a first microcode in a read only control store (5);

b) storing a second microcode in a random access control store (4);

ba) if said first microcode contains a faulty microinstruction (Add W1,W2):

baa) storing a flag microinstruction (REP mark 1) in said second microcode which indicates that the first microcode comprises said faulty microinstruction said storing being accomplished by writing said flag microinstruction into said random access control store, bab) storing a repair address (mark 1 addr.) belonging to said flag microinstruction for specifying an address of a repair microcode for said faulty microinstruction;

c) multiplexing for selectively providing the outputs of said random access control store or the outputs of said read only control store to said microprogrammable processor;

d) temporarily storing said microinstructions output from said random access control store via a register means;

e) decoding said temporarily stored microinstructions in said register means if the output of said read only control store is provided to said microprogrammable processor;

f) generating a control signal if said decoded microinstruction is said flag microinstruction;

g) receiving said generated control signal at an inhibiting means;

h) inhibiting the carrying out of the faulty microinstruction by the microprogrammable processor upon receiving said generated control signal at said inhibiting means; and i) storing a jump address (B mark 2; mark 2 addr.) in said random access control store, said jump address belonging to the repair microcode for specifying an address (mark 2 addr.) in said first microcode which belongs to the correct microcode.

7. The method of claim 6 further comprising the steps of jumping to said repair address and outputting of said repair microcode.

8. The method of claim 7 further comprising the step of jumping to a jump address(B mark 2; mark 2 addr.) wherein said jump address belongs to the repair code for specifying an address (mark 2 addr.) in said first microcode which belongs to correct microcode.

* * * * *